United States Patent [19]

Lebby et al.

[11] Patent Number: 5,534,888

[45] Date of Patent: Jul. 9, 1996

[54] ELECTRONIC BOOK

[75] Inventors: Michael S. Lebby, Apache Junction, Ariz.; Thomas H. Blair, Schaumburg, Ill.; Gary F. Witting, Scottsdale, Ariz.

[73] Assignee: Motorola, Schaumburg, Ill.

[21] Appl. No.: 190,976

[22] Filed: Feb. 3, 1994

[51] Int. Cl.⁶ .............................. G09G 1/00; G06F 15/02
[52] U.S. Cl. .................... 345/121; 345/901; 361/681; 364/708.1
[58] Field of Search ................................ 345/87, 173, 50, 345/901, 121, 145, 800; 341/22; 340/825.44; 361/681, 685, 683, 684; 379/50; 395/145, 800; 434/169; 364/708; D14/106

[56] References Cited

U.S. PATENT DOCUMENTS

| | | | |
|---|---|---|---|
| D. 338,455 | 8/1993 | Suge | D14/106 |
| 4,159,417 | 6/1979 | Rubincam | 345/87 |
| 4,545,023 | 10/1985 | Mizzi | 345/173 |
| 4,855,725 | 8/1989 | Fernandez | 345/173 |
| 4,918,632 | 4/1990 | York | 364/708 |
| 4,939,514 | 7/1990 | Miyazaki | 341/22 |
| 4,948,232 | 8/1990 | Lange | 345/50 |
| 5,043,721 | 8/1991 | May | 340/825.44 |
| 5,109,354 | 4/1992 | Yamashita et al. | 361/681 |
| 5,128,981 | 7/1992 | Tsukamoto et al. | 379/58 |
| 5,199,104 | 3/1993 | Hirayama | 395/145 |
| 5,209,665 | 5/1993 | Billings et al. | 434/169 |
| 5,239,665 | 8/1993 | Tsuchiya | 395/800 |

FOREIGN PATENT DOCUMENTS

| | | |
|---|---|---|
| 52-42328 | 4/1977 | Japan . |
| 62-44826 | 2/1987 | Japan . |

*Primary Examiner*—Steven Saras
*Attorney, Agent, or Firm*—Gary F. Witting; Eugene A. Parsons

[57] ABSTRACT

A multi-piece body (102) having a first hollow body (103) with a surface (105) and a second hollow body (108) with a surface (110) is provided. The first hollow body (103) and the second hollow body (108) is hingeably affixed such that the surface (105) of the first hollow body (103) and the surface (110) of the second hollow body (108) are capable of being closed on each other. A computer including a processor (560) for manipulating data, memory for data storage, an input for entering data, and an output for removing data is located in the multi-piece body (102). A plurality of optical displays (116) are operably coupled to the electronics 130, thereby enabling data to be optically displayed with the plurality of page displays (116).

23 Claims, 3 Drawing Sheets

ELECTRONIC BOOK

BACKGROUND OF THE INVENTION

This invention relates, in general, to optical displays and, more particularly, to optical displays in electronic books.

Generally, electronic products contain a means of at least one interface with the user. This interface can be made through a number of available techniques, such as, but not limited to, audio, visual, or even vibration. Unfortunately, with respect to the visual interface, a single display typically is available even though users may like or require more than one visual image to be displayed at any one time.

Electronic products that display text or graphics today typically have available one screen that the user needs to view to interface with the electronic product or unit. However, even though the single screen actually displays a variety of images, e.g., data, text, video, or graphics, the unit or the product is not designed to be viewed as a conventional book with two hardcovers and a plurality of pages, thereby severely limiting today's electronic products. Further, in today's electronic products, manual or electromechanical switches have to be activated so that a consecutive screen full of text can be shown. This requires the user to actively locate the switch, whether it be a mouse, track-ball or keypad, for a sequential and smooth flow of information. In addition, these electronic products such as but not limited to; lap-top computers, palm-top computers, personal digital assistants etc., are not optimally designed to be held and interfaced like a conventional book to the user, thereby making these electronic products difficult to use. Moreover, all electronic products necessitate the user to become accustomed to a new way of interfacing data, text, video, and graphics etc. by interfacing with a single display that is different and less convenient than the standard approach of interfacing with a conventional book.

It is therefore very important to design a display and associated electronic controls that provide a smoother interface with data, text, video and graphics than is currently available today.

SUMMARY OF THE INVENTION

Briefly stated, a multi-piece body having a first hollow body with a surface and a second hollow body with a surface is provided. The first hollow body and the second hollow body are hingeably affixed such that the surface of the first hollow body and the surface of the second hollow body are capable of being closed on each other. Electronics including a processor for manipulating data, memory for data storage, an input for entering data, and an output for removing data is located in the multi-piece body. A plurality of optical displays located between the surface of the first hollow body and the surface of the second hollow body are operably coupled to the electronics, thereby enabling data to be optically displayed with the plurality of optical displays.

It is an advantage of the present invention to provide a plurality of optical displays with associated electronic controls that allows a user to interface in a more conventional manner.

It is a further purpose of the present invention to provide an electronic book that contains a plurality of pages that can be turned for a continual flow of data, text, video, and graphics.

DETAILED DESCRIPTION OF THE DRAWINGS

Figure 1:
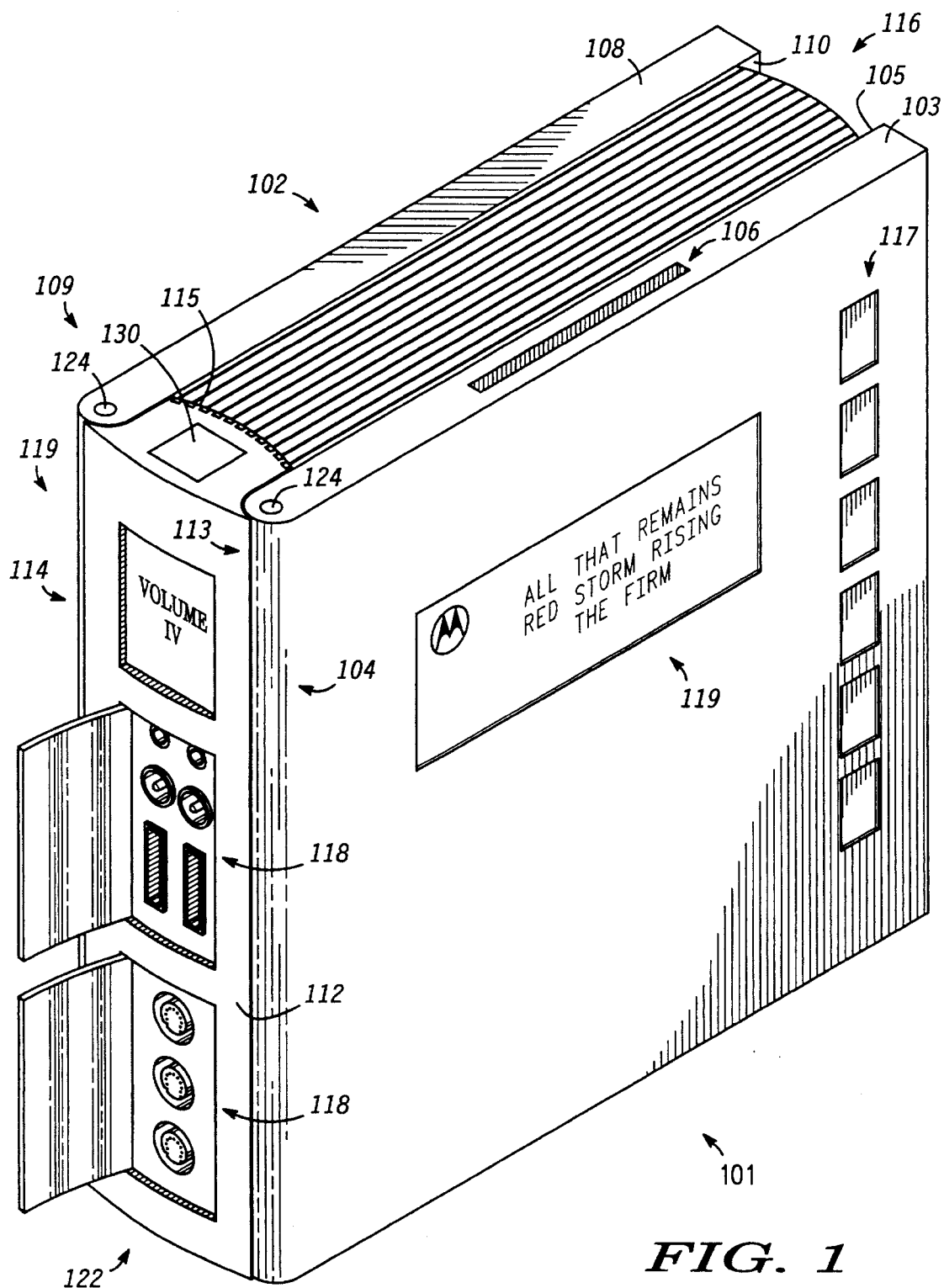
FIG. 1 is a pictorial perspective illustration of an electronic book.

FIG. 1 illustrates an electronic book 101 that includes several main elements or features, such as a multiple piece body or multi-piece body 102 having first hollow body 103 with a surface 105 and an edge 104, second hollow body 108 with a surface 110 and an edge 109, a third hollow body 112 having a surface 115 and edges 113, 114, a plurality of display pages 116, a plurality of function buttons or keys 117, and a plurality of displays 119.

Multiple piece body 102 of electronic book 101 typically is made by any suitable well-known material in the art, such as plastics, metals, resins, or the like, as well as being formed by any well-known method in the art, such as molding, milling, or the like. However, in a preferred embodiment of the present invention, high impact plastic materials are injection molded to form multiple piece bodies 102. Additionally, it should be noted that surfaces of multiple piece bodies 102 are sometimes covered with a leather or a leather like material so as to simulate a leather bound book. Further, it should be understood that first hollow body 103, second hollow body 108, and third hollow body 112 are sometimes made of several pieces (not shown) that are assembled; however, for the sake of simplicity, these engineering details have been omitted in order to clearly present the present invention.

Electronic book 101 illustrated in FIG. 1, is assembled with first hollow body 103 and second hollow body 108 being joined or connected to third hollow body 112. More specifically, edge 104 of first hollow body 103 and edge 109 of hollow body 108 are hingeably joined or connected at point 124 to edges 113 and 114 of third hollow body 112, respectively. Joining of first and second hollow bodies 103 and 108 to third hollow body 112 is achieved at point 124 by any suitable method, such as hinges or the like. It should be understood that joining of first and second hollow bodies 103 and 108 to third hollow body 112 allows for operable connection of the plurality of buttons 117, the plurality of displays 119, and the plurality of page displays 116 to be interfaced or interconnected to electronics, illustrated as box 130, described hereafter.

Generally, multiple piece body 102 is designed and constructed such that electronics 130 includes a variety of electronic components, such as a Micro-Processing Unit (MPU), a memory, logic circuitry, and the like that are interconnected and fitted into multiple piece body 102. Additionally, it should be noted that specific positioning of the various electronic components in multiple piece body 102 is application specific, thus enabling a wide range of locations for the electronic components.

The plurality of function buttons or keys are made by any suitable method, such as electromechanical, electronic or the like. The plurality of function buttons or keys 117 is located for convenient use of the; operator so as to select a variety of controls or functions, such as pagination, contrast, brightness, and volume. Additionally, a plurality of input and output connectors 117 are available for the user to couple electronic book 101 to a variety of electronic accessories (not shown), such as a telephone line, personal computer, personal digital assistant, or the like. Further, input apparatus 106 provides several other alternatives for inputting information or data into electronic book 101, such as a Compact Disk drive, floppy-disk drive, or the like, thus enabling a wide variety of data or information to be entered into electronic book 101. Additionally, it should be understood that input apparatus 106 is used in several modes of operation, such as a read mode, a write mode, or a combination of both read and write modes.

The plurality of displays 119 located on exterior surfaces enable electronic book 101 to enable the user to ascertain general types of information regarding data or information stored in the electronics of electronic book 101, such as titles, owner identification, volume number, or the like. The plurality of displays 119 is made by any suitable method or technology, such as, but not limited to, liquid crystal display technology, vacuum field emission device technology, electro-luminescent technology, plasma liquid crystal technology, light emitting diode technology, or the like.

The plurality of page displays 116 are made by any suitable technology, such as, but not limited to, liquid crystal display technology, vacuum field emission device technology, electro-luminescent technology, plasma liquid crystal technology, light emitting diode technology, and the like. Additionally, physical characteristics of the plurality of page displays 116 differ depending upon the specific application selected and the specific technology selected to make the plurality of page displays 116. For example, flexibility of the plurality of page displays 116 is accomplished by using polymer based liquid crystal display technology.

Figure 2:
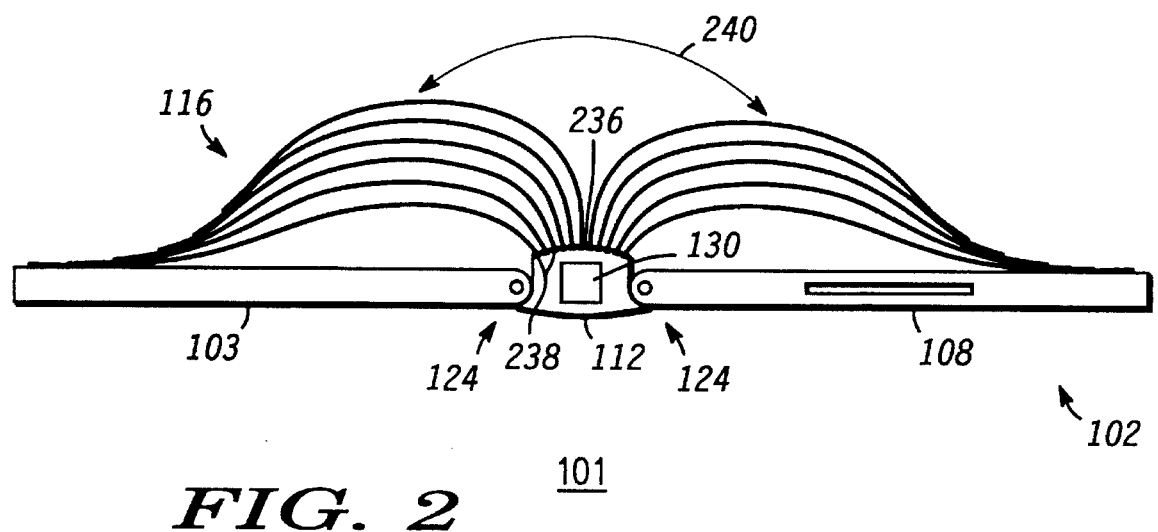
FIG. 2 is a sectional view of an electronic book.

FIG. 2 is a simplified sectional view of electronic book 101 illustrating a simplified view of some internal workings of electronic book 101. It should be understood that similar features or elements previously described in FIG. 1 will retain their original identifying numerals.

As can be seen in FIG. 2, first and second hollow bodies 103 and 108 are positioned in an open position at points 124 that hingeably joins multiple piece body 102, thus enabling some of the plurality of page displays 116 to be visible and usable. Electronics 130 is shown as being located in third hollow body 112; however, it should be understood that mounting of electronics 130 is application specific, thus enabling electronics 130 to be located anywhere in multiple piece body 102. It should be understood that electronics 130 is operably connected to the various features and elements described hereinabove, thereby enabling electronics 130 to control the various elements and features.

The plurality of page displays 116 are mounted to surface 236 of third hollow body 112 by any suitable method. More specifically, the plurality of page displays 116 are mounted in a plurality of electromechanical coupling devices 238. The plurality of electromechanical coupling devices 238 are operably coupled to individual page displays of the plurality of page displays 116 so as to enable information stored in electronics or computer 130 to be displayed correctly on the plurality of page displays 116. Further, turning of an individual page of the plurality of page displays 116 enables electronics 130 to update the plurality of page displays 116, thereby enabling the user to look back and forth through the displayed information on the plurality of page displays 116 so as to obtain a complete overall scope of the displayed material.

Figure 3:
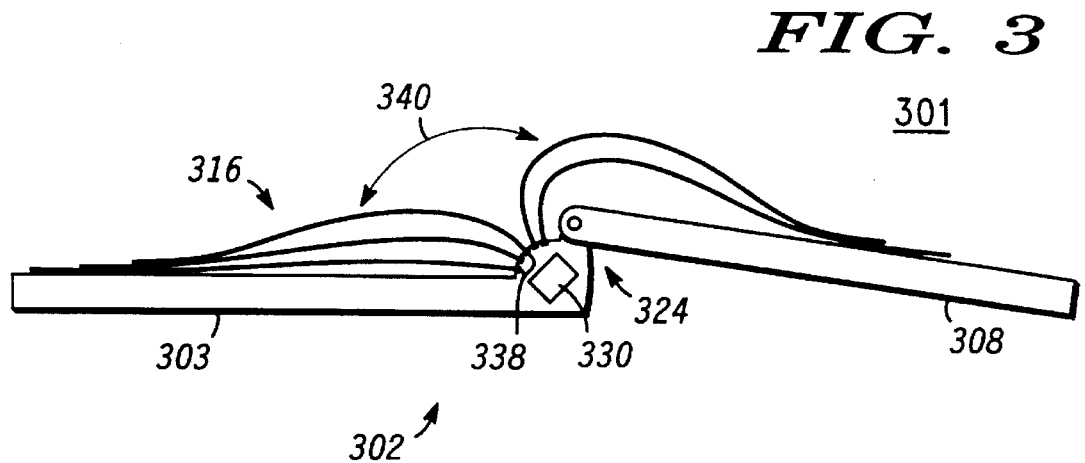
FIG. 3 is a sectional view of another embodiment of an electronic book.

FIG. 3 shows a simplified sectional view of another embodiment of an electronic book designated 301. In the present embodiment of electronic book 301, multiple piece body 302 includes a first hollow body 303 and a second hollow body 308. First hollow body 303 is hingeably affixed to second hollow body 308 by a joint or point 324. Typically, joint 324 is hingeable mechanism that allows hollow body 308 to close onto hollow body 303 with the plurality of page displays 116 being contained therebetween. It should be understood that electronics 330 is operably coupled to the various electronic devices and elements found in FIGS. 1 and 2. Further, the plurality of display pages 316 is coupled to electronics 330 by the plurality of electromechanical coupling devices 338, thereby enabling the plurality of the display pages 316 to be turned, as indicated by arrow 340 drawn in FIG. 3.

In function regarding FIG. 1, FIG. 1 illustrates electronic book 101 in a closed position with the plurality of page displays 116 located between first and second hollow bodies 103 and 108. However, it should be understood that while electronic book 101 is shown in the closed position other electronic accessories, such as a paging system (shown in FIG. 5), the plurality of displays 119, and the like are functioning, thereby providing the user a variety of communications accessories. For example, the plurality of displays 119 is capable of being read, as well as scrolled through by the plurality of function keys 117, so as to identify textual materials contained in electronic book 101 such as incoming pages, cataloging or storing received paging messages, titles stored materials, and the like.

In function and illustrated it, FIGS. 2 and 3, electronic books 101 and 301 respectively, are opened so as to utilize the plurality of page displays 116, 316. Opening of first and second hollow bodies 103, 303 and 108, 308 activates the plurality of display pages 116, 316 to display textual and graphical material contained in memory of the electronic book 101, 301, thereby enabling the user to read the individual page display. Further, as individual pages of the plurality of display pages 116, 316 are turned electronics 130, 330 senses each of the pages that is being turned and updates the subsequent pages, thus enabling the plurality of display pages 116, 316 to be used in a normal and convenient fashion.

Several electronic modes may be selected to improve convenience and efficiency of electronic book 101. For example, turning of a last page of the plurality of display pages 116 triggers the subsequent pages to begin on the first page of the plurality of display pages 116, thus enabling the user to continue through the stored material page after page. Conversely, turning of the first page of the plurality of display pages 116 triggers a reverse sequencing so as to enable the reader to page backwards through the material.

Figure 4:
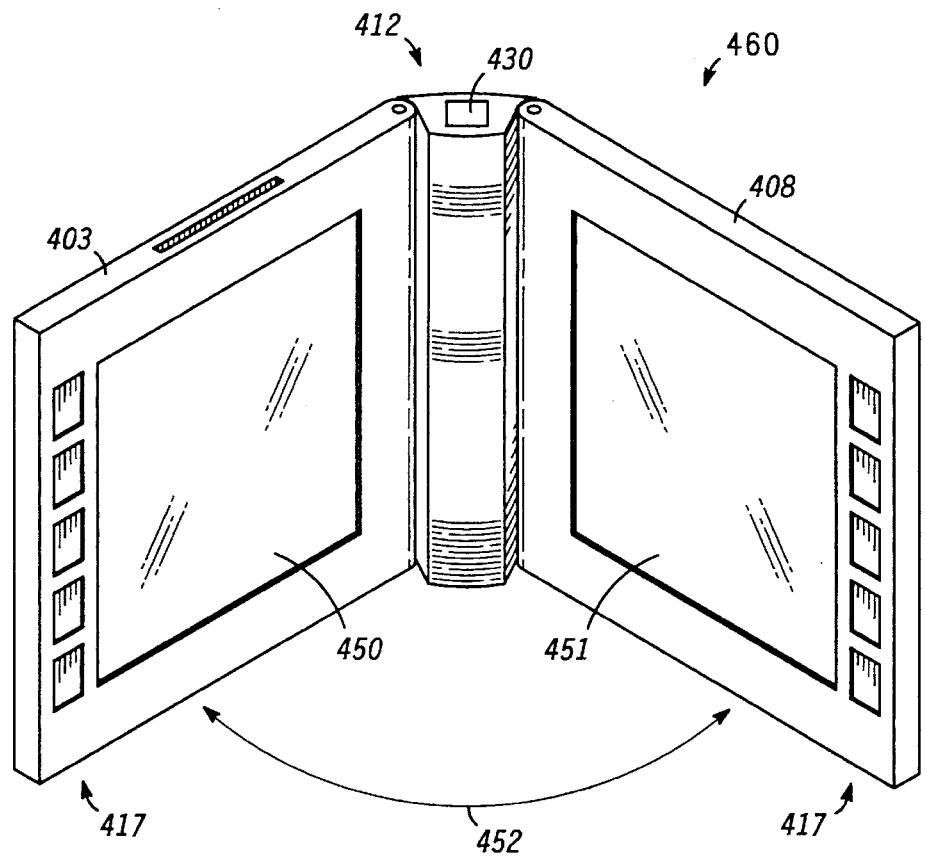
FIG. 4 is a pictorial illustration of yet another embodiment of an electronic book.

FIG. 4 shows a simplified illustration of another embodiment of electronic book 460. It should be understood that similar features or elements that have been previously illustrated will retain their original identifying numerals except that the first digit will be replaced with a 4. Electronic book 401 in this particular embodiment of the present invention includes several elements or features, such as a hollow body 403, a hollow body 408, a plurality of function keys 417, a first display 450, and a second display 451. A third hollow body 412 can be incorporated into the design of electronic book 401; however, it should be understood that third hollow body 412 can also be integrated into either hollow body 403 or 408, thus enabling electronic book 401 to be simplified into having a first hollow body 403 and a second hollow body 408.

As shown in FIG. 4, first and second hollow bodies 403 and 408 can be opened and closed as indicated by arrow 452. In the open position, displays 450 and 451 are usable, thus enabling graphical and textual materials to be displayed on displays 450 and 451. In this particular embodiment of the present invention, displays 450 and 451 act individually as pages of a book that are controlled by electronics 430. Pagination or the turning of pages is accomplished by the plurality of function keys 417 located along a periphery of either hollow body 403 or hollow body 408. It should be understood and as previously described hereinabove, the plurality of function keys 417 and displays 450 and 451 are operably connected to electronics or processing center 430, thus enabling the user to operate electronic book 401.

Displays 450 and 451 are made using any suitable display technology, such as liquid crystal display (LCD), field emission devices (FED), light emitting diodes (LED), or the like.

In function and by way of example, with the central processing unit or electronics 430 containing a novel or other textual or graphical materials, a first page is displayed on display 450 and a second page is displayed on display 451. The user reads the first page on a 450 and subsequently reads the second page on 451. At the completion of reading the second page display on 451 the user paginates by pressing one of the plurality of function keys 417 to move textual or graphical material to a third and fourth page which is displayed on displays 450 and 451, respectively. Thus, the user is enabled to read and page through material, such as a book or novel, in a normal and simplistic manner. Use of electronic book 401 enables the user to read or look through textual or graphical material in an easier and more efficient manner. Further, the user does not have to use a scrolling type method in order to either paginate forward or backward, thus enabling the user to be more comfortable with the textual or graphical material.

Figure 5:
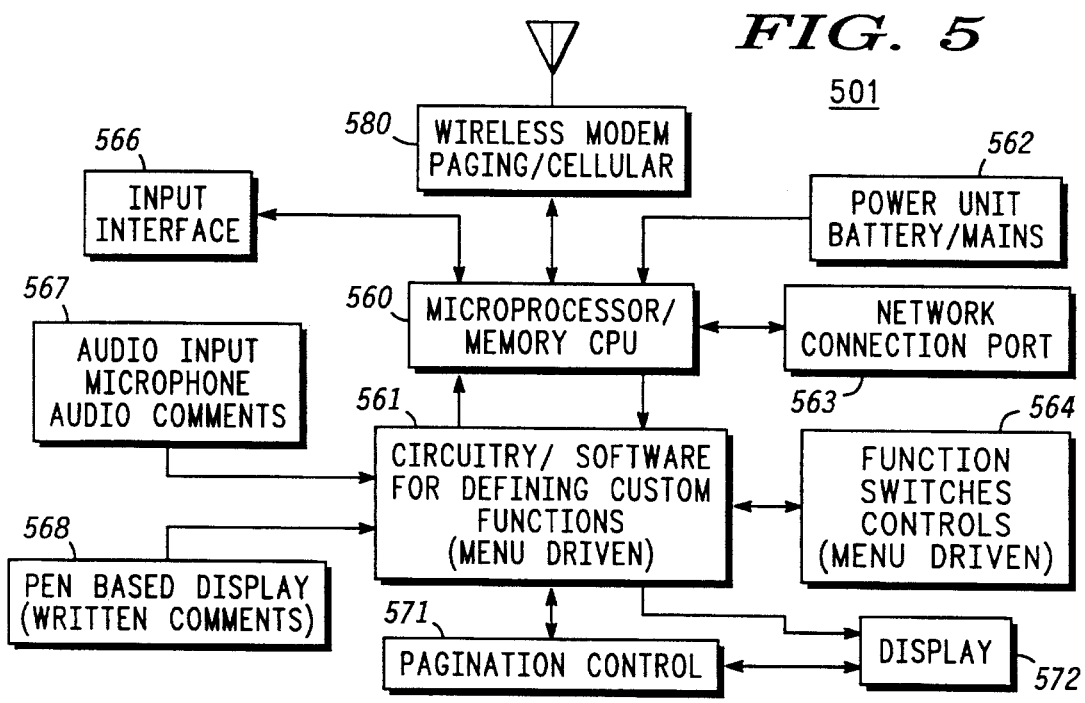
FIG. 5 is a functional block diagram of an electronic book.

FIG. 5 illustrates a block diagram 501 of functional relationship between a variety of elements associated with electronic book 101 as shown in FIGS. 1–4. Generally, electronics or central processing unit (CPU) 560 controls peripheral accessories and interconnections by well-known methods in the art. Associated with CPU 560 are circuitry/software 561 for defining custom functions found in a menu driven central processing unit 560 that is capable of being somewhat modified to suit an individual user, thus allowing customization of some of the peripheral accessories and form of displays visualized in electronic books 101, 301, and 401.

Power unit 562 is connected to central processing unit 560, thus providing power for essential functions of central processing unit 560. It should be understood that any suitable power source is used for power unit 562, such as an AC power source, a battery source, or the like.

As shown in FIG. 5, MPU 560 is networked so that data or information can be downloaded or uploaded between a network and microprocessor 560. Networking of the MPU 560 is achieved by a variety of methods such as direct electrical connection utilizing some of the plurality of input/output connectors 122 (shown in FIG. 1), a wireless link 580 having a radio receiver and a radio transmitter for paging and cellar communications, or the like. Functional switches or controls 564 are connected to circuitry/software 561 to enable utilization of functional systems defined by the software, firmware, and MPU 560. Generally, functional switches or controls 564 are activated by a variety of mechanisms, such as pressing one of the plurality of function buttons or keys 117, and 417 shown in FIGS. 1 and 4, respectively. Alternatively, functions or controls 564 may be menu driven with a cursor or stylus on a page of either the plurality of page displays 116 or displays 450, 451.

Input interface 566 is coupled to MPU 560, thus allowing input of data into MPU 560. By way of example, input 566 can be a variety of different structures, such as a floppy disk drive, a CD ROM, a hard disk, or the like. By enabling input interface 566 to be interactive with MPU 560, continual updates of information is capable of being exchanged between input interface 566 and MPU 560 so that the user can easily and efficiently utilize the data inputted through input interface 566.

Audio input/output 567 is coupled to circuitry/software 561 so that audio information or data are inputted into circuitry/software 561 and ultimately utilized and processed by MPU 560. Audio input/output 567 enables MPU to be voice operated, thus enabling voice commands to be issued to MPU 560. Further, since audio input is coupled to MPU 560, audio input/output 567 enables editorial remarks to be overlaid onto selected data or information as desired. Additionally, audio input/output allows the user to listen to information entered into MPU 560. For example, digital or analog signals comprising a movie are entered into the MPU 560, thus enabling display 572 and audio output of audio input/out 567 to be used as a multimedia display.

Pen based input 568 is coupled to circuitry/software 561 for inputting messages by a cursor or in handwriting.

Pagination control 571 is coupled to circuitry/software 561 which is further coupled to MPU 560, thus enabling proper sequencing of pages that are to be displayed in display 572. Pagination control 571 is controlled by any suitable means, such as pressing an individual button of the plurality of buttons 117, 417, actuating electromechanical coupling device 238, voice actuation, or the like. These various methods control and select the proper image for display 572 to have, thus enabling the user to read the selected material that is imaged on display 572.

By now it should be appreciated that a novel electronic book has been described. The electronic book allows for a more convenient and efficient electronic communication device to be made. The electronic book enables a mixed media format to be displayed so that the user can not only have written textual/graphical material, but also audio material may be used as well. Further, the electronic book enables the user to utilize electronic medium material in the form of a standard book. Moreover, the electronic book provides a platform that is easily interacted with and that can be modified by the input means.

We claim:

1. An electronic book comprising:

a multiple piece body including a first hollow body having a surface and an edge surface, a second hollow body having a first edge surface and a second edge surface, and a third hollow body having a surface and an edge surface, the edge surface of the first hollow body being hingeably attached to the first edge surface of the second hollow body and the edge surface of the third hollow body being hingeably attached to the second edge surface of the second hollow body;

a computer located in the multiple piece body including a processor for manipulating data, memory for data storage, an input for entering data, and an output for removing data;

a plurality of page displays operably coupled to the output of the computer for displaying data from the computer and attached to the multiple piece body such that closing the surface of the first hollow body onto the surface of the third hollow body protects the plurality of page displays; and a switch mounted to the second hollow body between the first edge surface and the second edge surface, as well as coupled to at least one of the plurality of page displays and to the computer so that turning the at least one of the plurality of page displays advances the data through the plurality of page displays.

2. An electronic book as claimed in claim 1 wherein the plurality of page displays are flexible.

3. An electronic book as claimed in claim 1 wherein the plurality of page displays are selected from a group consisting of: light emitting diode displays, liquid crystal displays, plasma liquid crystal displays, vacuum field emission displays, polymer displays and electro-luminescent displays.

4. An electronic book as claimed in claim 1 further comprising an electromechanical button located on the multiple piece body operably coupled to the computer for advancing data and displaying the advanced data through the plurality of page displays.

5. An electronic book as claimed in claim 1 further comprising a radio frequency receiver and a radio frequency transmitter.

6. An electronic book as claimed in claim 5 wherein the radio frequency receiver is a pager.

7. An electronic book as claimed in claim 5 wherein the radio frequency receiver and the radio frequency transmitter are a two-way communication device.

8. An electronic book as claimed in claim 1 further comprising a switch operably coupled to at least one of the plurality of page displays.

9. An electronic book as claimed in claim 1 further comprising a data input system operably connected to the input of the computer.

10. An electronic book as claimed in claim 9 wherein the input system includes a compact-disk drive.

11. An electronic book as claimed in claim 10 wherein the input system includes a floppy-disk drive.

12. An electronic book as claimed in claim 10 wherein the input system includes a microphone.

13. An optoelectronic intelligent book comprising:

a multiple piece body including a first hollow body with a surface and a second hollow body with a surface, the first hollow body is hingeably affixed to the second hollow body such that the surface of the first hollow body and the surface of the second hollow body are capable of being closed on each other;

a computer located in the multiple piece body including a processor for manipulating data, memory for data storage, an input for entering data, and an output for removing data; and a plurality of optical page displays each page display being mounted between the first hollow body and the second hollow body for viewing by an operator and operably coupled to the computer for optically displaying data from the computer; and a switch mounted to the second hollow body between the first edge surface and the second edge surface, as well as coupled to at least one of the plurality of page displays and to the computer so that turning the at least one of the plurality of page displays advances the data through the plurality of page displays.

14. An optoelectronic intelligent book as claimed in claim 13 further comprising an electromechanical button located on the multiple piece body and operably connected to the computer for advancing data and displaying the advanced data through the plurality of optical page displays.

15. An electronic book as claimed in claim 13 wherein the plurality of optical page displays are selected from a group of displays comprising: light emitting diode displays, liquid crystal displays, plasma liquid crystal displays, vacuum field emission displays, polymer displays and electro-luminescent displays.

16. An electronic book as claimed in claim 13 further comprising a radio frequency receiver and a radio frequency transmitter.

17. An electronic book as claimed in claim 13 wherein the radio frequency receiver includes a pager.

18. An electronic book as claimed in claim 13 further comprising wherein the radio frequency receiver and the radio frequency transmitter are a two-way communication device.

19. An electronic book as claimed in claim 13 further comprising a data input system operably connected to the input of the computer.

20. An electronic book as claimed in claim 19 wherein the input system includes a compact-disk drive.

21. An electronic book as claimed in claim 19 wherein the input system includes a floppy-disk drive.

22. An electronic book as claimed in claim 19 wherein the input system includes a microphone.

23. An electronic book comprising:

forming a multiple piece body including a first hollow body having a surface and an edge surface, a second hollow body having a first edge surface and a second edge surface, and a third hollow body having a surface and an edge surface, the edge surface of the first hollow body being hingeably attached to the first edge surface of the second hollow body and the edge surface of the third hollow body being hingeably attached to the second edge surface of the second hollow body;

forming a computer located in the multiple piece body including a processor for manipulating data, memory for data storage, an input for entering data, and an output for removing data;

forming a plurality of page displays operably coupled to the output of the computer for displaying data from the computer and attached to the multiple piece body such that closing the surface of the first hollow body onto the surface of the third hollow body protects the plurality of page displays; and placing a switch coupled to at least one of the plurality of page displays and to the computer so that turning the at least one of the plurality of page displays advances the data through the plurality of page displays upon turning least one page of the plurality of page displays.

\* \* \* \* \*